T. Duncanson.
Corn Planter.
Nº 85,516.          Patented Jan. 5, 1869.
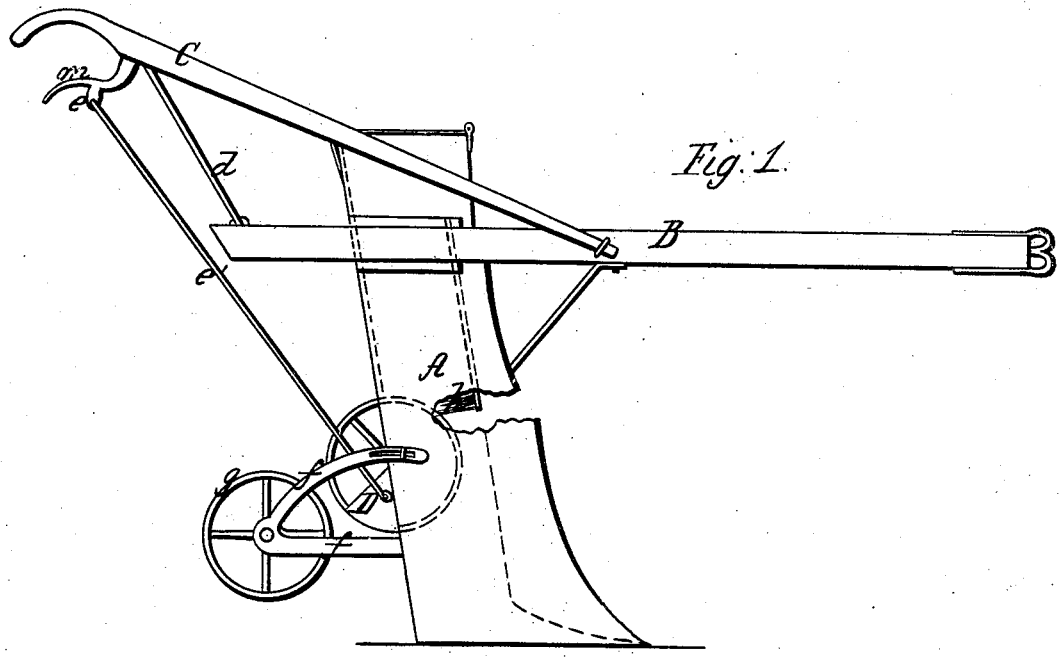
Fig. 1.
Fig. 2.
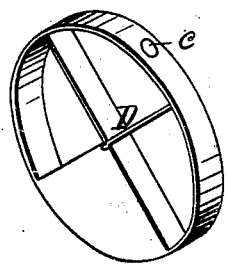
Witnesses:
J. Alfred Ellis
J. P. White
Inventor;
T. Duncanson
Per
J. H. Alexander
Atty

THOMAS DUNCANSON, OF BUFORD, OHIO.

Letters Patent No. 85,516, dated January 5, 1869.

IMPROVEMENT IN CORN-PLANTER.

The Schedule referred to in these Letters Patent and making part of the same.

*To all whom it may concern:*

Be it known that I, THOMAS DUNCANSON, of Buford, in the county of Highland, and State of Ohio, have invented certain new and useful Improvements in Corn-Planters; and I do hereby declare that the following is a full, clear, and exact description thereof, reference being had to the accompanying drawings, and to the letters of reference marked thereon, which form a part of this specification, and in which—

Figure 1 represents a side elevation of my corn-planter, and

Figure 2, a perspective view of the dropper or distributer.

The nature of this invention consists in the employment of a weighted wheel, provided with a cavity for the reception of the grains of corn to be distributed or dropped, and operated substantially in the manner hereinafter set forth.

To enable others skilled in the art to which my invention appertains, to make and employ the same, I will now describe its construction and operation.

In the accompanying drawings—

A represents the receptacle or vessel for receiving the corn, which is provided with a chamber passing through its entire length, and made with a cutting-edge, and pointed on its lower portion, as seen in fig. 1.

B is the beam, to which the horses are attached, and embracing the upper part of A, and there secured by strips or supports on each side.

C designates the handles, secured at their front ends to beam B, and fastened at their rear ends to the projecting ends of the beam B, by means of metal rod $d$. (See fig. 1.)

D represents the dropper, which consists in constructing a weighted wheel, and providing the same with a cavity, $c$, on the periphery of the wheel, opposite its weighted portion, and having its bearing on an axle passing through the sides of the upper portion of A.

$h$ is a brush, secured, by means of its handle, to the inner side of the front part of receptacle A, so that its outer end will rest on the periphery of the wheel or dropper D, for the purpose of separating the grains of corn.

$g$ represents a roller or wheel, having its bearings in the outer ends of supports $ff$, which consist of a horizontal bar, to the upper side of which it is formed with a curved arm, slotted at its inner end, and sliding back and forth, or in a semicircular direction, on a projection secured to each side of the vessel A, for the purpose of allowing the roller to be raised or lowered, to suit the depth at which it is desired to set the plow or lower end of A.

$m$ designates a lever, pivoted in the outer end of one of the handles, and furnished on its lower side with a projection, $e$, to which is attached a metal rod, $e'$, extending down to and secured to the weighted portion of the dropper D, and, by means of this lever, the dropper can be operated.

An advantage which I claim in so constructing the dropper is, that when the grains of corn have been dropped from it, and the hand removed from the lever $m$, its own weight will bring the cavity in contact with another grain after having been pushed forward, thus obviating the constant pushing back of the lever $m$.

What I claim, and desire to secure by Letters Patent, is—

The dropper or weighted wheel D, provided with the cavity $c$, arranged and operating substantially as and for the purpose set forth.

In testimony that I claim the foregoing as my own, I affix my signature, in presence of two witnesses.

THOMAS DUNCANSON.

Witnesses:
 JOHN BELL,
 A. E. BELL.